Dec. 20, 1955  G. H. STEARLEY  2,728,044
REGULATOR SYSTEMS
Filed Aug. 16, 1954  2 Sheets-Sheet 1

United States Patent Office 2,728,044
Patented Dec. 20, 1955

2,728,044

REGULATOR SYSTEMS

George H. Stearley, Lima, Ohio, assignor to Westinghouse Electric Corporation, East Pittsburgh, Pa., a corporation of Pennsylvania Application August 16, 1954, Serial No. 449,915

2 Claims. (Cl. 322—24)

This invention relates to regulator systems and more particularly to means for improving the accuracy of the regulator system without impairing its stability.

In a conventional generator-regulator closed-loop system the regulator senses the output voltage of the generator, and controls the level of generator field excitation to give a nearly-constant output voltage. The magnitude of the actual deviation in voltage from the desired value depends largely on the amplification or gain around the closed loop. However, if the amplification or loop gain is comparatively high, this generally leads to a higher degree of instability or hunting than can be tolerated.

In practice, aircraft type alternating-current generators having integral direct-current exciters operate over a wide range of speeds. Inasmuch as the saturation curves of both the exciter and generator shift with speed changes, an appreciable change in exciter field current is required, if constant generator output voltage is to be maintained from minimum-speed full-load to maximum-speed no-load. Furthermore, if the system is required to operate for extended periods at minimum-speed full-load, or for a specified interval at overload, an additional increment of exciter field current is required to overcome the increase in generator field resistance due to self-heating. Under these conditions, a conventional system will provide reasonably close regulation only if the amplification or loop-gain is comparatively high. However, as hereinbefore mentioned, this generally leads to an intolerable degree of instability. Heretofore, a compromise thus had to be effected, resulting in lower loop-gain with attendant poorer regulation. Thus, there is a need for a regulator system which will assure good regulation without impairing system stability.

An object of this invention is to provide in a generator regulator system for compensating for changes in the temperature of the generator field winding, for changes in the speed of the generator and its associated exciter, and for changes in the magnitude of the generator load, by so interposing a compounding circuit in the regulator system that the desired correcting action takes place.

Another object of this invention is to provide for accurately regulating the output voltage of a generator-exciter combination for varying conditions without impairing system stability, by sensing the output voltage of the exciter armature and utilizing this signal to translate the reference or base level at which the regulator operates.

A further object of this invention is to provide for shifting the base line of a magnetic amplifier generator regulator in accordance with the output voltage of an exciter associated with the generator to thereby minimize the size of the magnetic amplifier and yet prevent generator output droop as caused by changes in the temperature of the field winding of the generator, by changes in the generator load, or by changes in the speed of the generator and its associated exciter.

Other objects of this invention will become apparent from the following description when taken in conjunction with the accompanying drawings in which.

Figure 1:
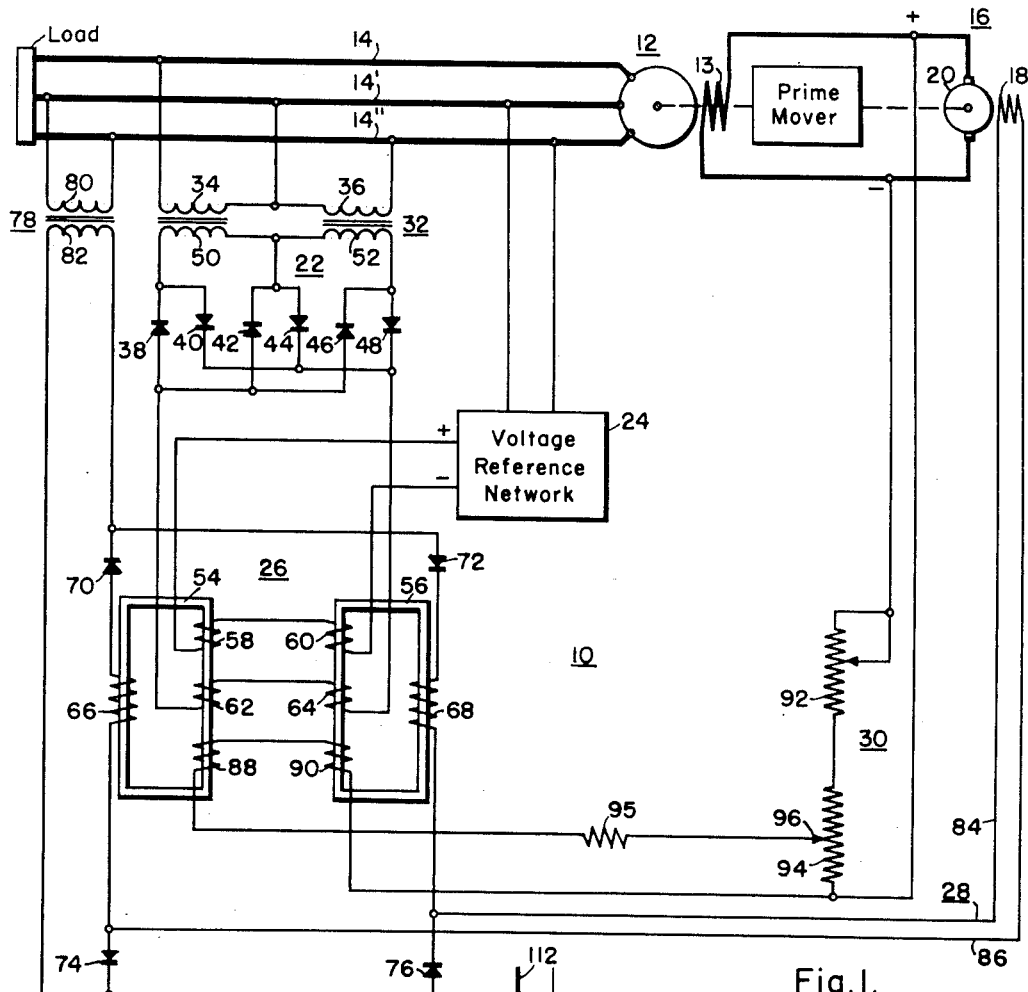
Figure 1 is a schematic diagram of a regulator system incorporating this invention.

Referring to Fig. 1 there is illustrated a regulator system 10 for maintaining the output voltage of a generator 12, having a field winding 13, substantially constant. In the embodiment illustrated, the generator 12 is a three-phase generator disposed to supply energy to load conductors 14, 14' and 14''. In practice, the field winding of the generator 12 is energized in accordance with the output voltage of a direct-current exciter 16, having a field winding 18. In particular, the field winding 14 is energized in accordance with the output voltage of the exciter armature 20.

The regulator system 10, in general, comprises a three-phase sensing network 22 responsive to the output voltage of the generator 12, a voltage reference network 24 responsive to the output voltage of the generator 12 and disposed to produce at its output a voltage which remains substantially constant over a wide range of variation in the magnitude and frequency of its input voltage, a device whose impedance can be changed, namely a magnetic amplifier 26 responsive to the current outputs of the sensing network 22 and the voltage reference network 24 and so constructed that the current outputs of the networks 22 and 24 produce opposing fluxes in the magnetic amplifier 26 which have a predetermined difference when the output voltage of the generator 12 is at its regulated value. In operation, the flux produced by the current output of the sensing network 22 is of greater magnitude than the flux produced in the magnetic amplifier 26 by the current output of the voltage reference network 24. Thus, in this instance, the sensing network 22 and the voltage reference network 24 are the means interconnected between the magnetic amplifier 26 and the output of the generator 12 for effecting a change in the magnitude of the output of the magnetic amplifier 26 in accordance with the deviation of the output voltage of the generator 12 from its regulated value.

Also included in the regulator system 10 is circuit means 28 for rendering the exciter 16 responsive to the output of the magnetic amplifier 26, and a compounding circuit 30 responsive to gradual changes in the magnitude of the output voltage of the exciter armature 20 for compensating for changes in the temperature of the field winding 13 of the generator 12, for changes in the speed of the generator 12 and its associated exciter 16, and for changes in the magnitude of the load on the generator 12. Such compensation is accomplished without impairing the stability of the regulator system 10 as will be explained more fully hereinafter.

By responding to gradual changes in the magnitude of the output voltage of the exciter armature 20 is meant that the compounding circuit 30 responds to steady state conditions such as change in the magnitude of the generator load, change in the temperature of the field winding 13 of the generator 12, or change in the speed of the generator 12 and its associated exciter 16.

In the embodiment illustrated, the sensing network 22 comprises a potential transformer 32 which is electrically connected to the load conductors 14, 14' and 14''. As illustrated, the transformer 32 comprises primary winding sections 34 and 36, the primary winding section 34 being electrically connected to the load conductors 14 and 14' and the primary winding section 36 being electrically connected to the load conductors 14' and 14''. For the purpose of rectifying the output of the transformer 32, rectifiers 38, 40, 42, 44, 46 and 48 are electrically connected to secondary winding sections 50 and 52 of the transformer 32.

As hereinbefore mentioned, the voltage reference network 24 is responsive to the output voltage of the generator 12 and is disposed to produce at its output a voltage which remains substantially constant over a wide range of variation in the magnitude and frequency of its input voltage. For a description and showing of a suitable voltage reference network, reference may be had to application Serial No. 377,061, filed August 28, 1953, and assigned to the same assignee as the subject application.

In the embodiment illustrated in Fig. 1, the magnetic amplifier is a self-saturating full-wave magnetic amplifier. As illustrated, the magnetic amplifier 26 comprises magnetic core members 54 and 56 which have disposed in inductive relationship therewith reference windings 58 and 60, respectively, and sensing windings 62 and 64, respectively. In order to render the reference windings 58 and 60 responsive to the output voltage of the voltage reference network 24, the reference windings 58 and 60 are connected in series circuit relationship with one another, the series circuit being connected to the output of the voltage reference network 24. On the other hand, in order to render the sensing windings 62 and 64 responsive to the output of the sensing network 22, the sensing windings 62 and 64 are connected in series circuit relationship with one another, the series circuit being connected to the output of the sensing network 22. As hereinbefore mentioned, the reference windings 58 and 60 are so disposed on their respective magnetic core members 54 and 56 that current flow therethrough produces a flux which opposes the flux produced by the current flow through the associated sensing windings 62 and 64, respectively.

The manner in which the sensing network 22 supplies direct current to the sensing windings 62 and 64 of the magnetic amplifier 26 can be better understood by tracing the flow of current through the sensing network 22. For instance, assuming the left end of the secondary winding section 50 is at a positive polarity with respect to the right end of the secondary winding section 50, as illustrated, current will flow from the left end of the secondary winding section 50 through the rectifier 40, the sensing windings 64 and 62, and the rectifier 42, to the right end of the secondary winding section 50. During the second phase in which the left end of the secondary winding section 52 is at a positive polarity with respect to the right end of the secondary winding section 52, as illustrated, current will flow from the left end of the seconday winding section 52 through the rectifier 44, the sensing windings 64 and 62, and the rectifier 46, to the right end of the secondary winding section 52. On the other hand, during the third phase in which the right end of the secondary winding section 52 is at a positive polarity with respect to the left end of the secondary winding section 50, as illustrated, current will flow from the right end of the secondary winding section 52 through the rectifier 48, the sensing windings 64 and 62, and the rectifier 38, to the left end of the secondary winding section 50, of the transformer 32.

Load windings 66 and 68 are disposed in inductive relationship with magnetic core members 54 and 56, respectively. In order to obtain self-saturation for the magnetic amplifier 26, self-saturating rectifiers 70 and 72 are connected in series circuit relationship with the load windings 66 and 68, respectively. Load rectifiers 74 and 76 are also connected in circuit relationship with the load windings 66 and 68, respectively, in order to provide a direct current output for the magnetic amplifier 26.

For the purpose of supplying energy to the load windings 66 and 68, a potential transformer 78 having a primary winding 80 and a secondary winding 82 is provided. In particular, the primary winding 80 is electrically connected to the load conductors 14' and 14". On the other hand, one end of the secondary winding 82 is electrically connected to the junction point of the self-saturating rectifiers 70 and 72, and the other end of the secondary winding 82 is electrically connected to the junction point of the load rectifiers 74 and 76. As illustrated, the load windings 66 and 68 are connected so as to effect a flow of current through the field winding 18 of the exciter 16. Thus, in operation, the field winding 18 of the exciter 16 is responsive to the output of the magnetic amplifier 26. This is accomplished by means of the circuit 28 which includes a conductor 84 connected between one end of the field winding 18 and the junction point of the rectifier 76 and the load winding 68, and a conductor 86 connected between the other end of the field winding 18 and the junction point of the rectifier 74 and the load winding 66.

In accordance with the teachings of this invention the compounding circuit 30 is interposed in the regulator system 10 so as to compensate for changes in the temperature of the field winding 13 of the generator 12 for changes in the speed of the generator 12 and its associated exciter 16, and for changes in the load on the generator 12. As hereinbefore mentioned, this compensation is accomplished without impairing the stability of the regulator system 10 since the gain and thus the size of the magnetic amplifier 26 can be maintained at a minimum.

Compounding circuit 30 comprises compensating windings 88 and 90, of the magnetic amplifier 26, which are disposed in inductive relationship with the magnetic core members 54 and 56, respectively. In practice, the compensating windings 88 and 90 are so disposed on their respective core members 54 and 56, and so interconnected with the output of the armature 20, of the exciter 16, that current flow through the compensating windings 88 and 90 produces a flux in their respective magnetic core members 54 and 56 that aids, or is in the same direction as, the flux produced by the current flow through the associated load windings 66 and 68, respectively. On the other hand, the sensing windings 62 and 64 are so disposed on their respective magnetic core members 54 and 56 that current flow therethrough produces a flux which opposes the flux produced by the current flow through the respective load windings 66 and 68.

In order to be able to adjust the magnitude of the current flow through the compensating windings 88 and 90 for a given condition, variable resistors 92 and 94 are provided. As illustrated, the variable resistors 92 and 94 are connected in series circuit relationship with one another, the series circuit being connected across the armature 20 of the exciter 16. Thus, the magnitude of the current flow through this series circuit, and thus the magnitude of the voltage across the variable resistor 94, can be adjusted by means of the variable resistor 92. In order to render the compensating windings 88 and 90 responsive to the voltage across a portion of the variable resistor 94, the compensating windings 88 and 90 are connected in series circuit relationship with one another and with a resistor 95 of high resistance value, one end of the series circuit being connected to a movable contact member 96 of the variable resistor 94, and the other end of the series circuit being connected to the lower end of the variable resistor 94, as illustrated. The function of the resistor 95 is to limit the flow of harmonic currents induced in the compensating windings 88 and 90 by the load windings 66 and 68. This assures that the response time and hence the stability of the magnetic amplifier 26 is not impaired.

The operation of the regulator system illustrated in Fig. 1 will now be described. In operation, the regulator system 10 compensates for changes in temperature in the field winding 13 of the generator 12 as brought about by changes in ambient temperature or by changes in the load on the generator 12. For instance, an increase in the temperature of the field winding 13 from its normal value effects a droop in the output voltage of the generator 12. A decrease in the output voltage of the generator 12 decreases the magnitude of the current flow through the sensing windings 62 and 64 of the magnetic amplifier 26, to thereby increase the magnetic saturation of the magnetic core members 54 and 56, and thus decrease the impedance of the load windings 66 and 68. With a decrease in the impedance of the load windings 66 and 68 the output power of the magnetic amplifier 26 is increased, thereby increasing the current flow through the field winding 18 of the exciter 16. An increase in the current flow through the field winding 18 increases the magnitude of the voltage across the armature 20 of the exciter 16 and thus increases the magnitude of the output voltage of the generator 12 in a direction to restore its output voltage to the regulated value. This action of itself, unless the gain of the amplifier 26 is extremely high with the hereinbefore mentioned disadvantages, does not completely restore the output voltage of the generator 12 to its regulated value. However, the output voltage of the generator 12 is restored to the regulated value by means of the action of the compounding circuit 30. In particular, the increase in the magnitude of the voltage across the armature 20 of the exciter 16, as hereinabove described, effects an increase in the current flow through the compensating windings 88 and 90, to thereby increase the magnetic saturation of the magnetic core members 54 and 56, to thus effect a further decrease in the impedance of the load windings 66 and 68. Such a further decrease in the impedance of the load windings 66 and 68 further increases the current flow through the field winding 18 of the exciter 16 and thus further increases the output voltage of the generator 12, and thus restores its output voltage to the regulated value.

Assuming the temperature of the field winding 13 decreases to a value below its normal value then the output voltage of the generator 12 increases. Such an increase in the output voltage of the generator 12 decreases the power output of the magnetic amplifier 26, thereby decreasing the magnitude of the current flow through the field winding 18 of the exciter 16. A decrease in the current flow through the field winding 18 decreases the magnitude of the output voltage of the armature 20 of the exciter 16, to thereby decrease the output voltage of the generator 12 a predetermined amount in the direction of its regulated value. However, the compounding circuit 30 effects a further decrease in the output voltage of the generator 12 and thus restores the output voltage of the generator 12 to its regulated value. In particular, with a decrease in the output voltage across the armature 20 the current flow through the compensating windings 88 and 90 decreases, to thereby further decrease the power output of the magnetic amplifier 26, and thus further decrease the current flow through the field winding 18 of the exciter 16, thereby returning the output voltage of the generator 12 to its regulated value.

Figure 2:
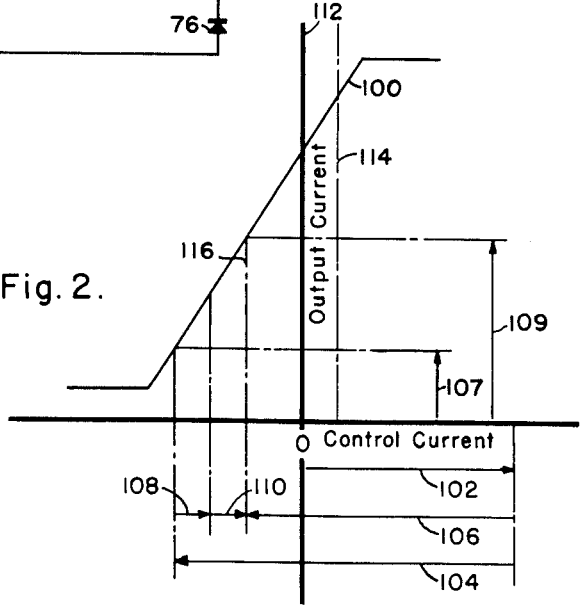
Fig. 2 is a graph illustrating the manner in which the regulator systems illustrated in Figs. 1 and 3 operate.

The manner in which the compounding circuit 30 effects the above described compensation can be better understood by referring to the graph of Fig. 2 in which a curve 100 represents the characteristic curve of the magnetic amplifier 26. In Fig. 2, the vector 102 represents, for instance, the effect of the reference windings 58 and 60. On the other hand, the vector 104 represents the effect of the associated sensing windings 62 and 64 for a given operating condition. Let us assume that the vector 106 represents the magnitude to which the sensing vector 104 must be reduced in order to restore the output voltage of the generator 12 to its regulated value. In other words, the output current of the magnetic amplifier 26 must be increased from a value as represented by the vector 107 to a value as represented by the vector 109.

In operation, the regulator loop including the magnetic amplifier 26, and excluding the compounding circuit 30, can effect a correcting action as represented by the vector 108. However, this of itself is not sufficient in order to return the sensing vector 104 to the value as represented by the vector 106. The remaining correction is effected by the compounding circuit 30. In particular, the vector 110 represents the correcting action effected by the compounding circuit 30. In other words, in operation, the compounding circuit 30 effects a shifting of the base line 112 to a position as represented by the base line 114. Of course, the magnitude of the distance between the base lines 112 and 114 is the same as the distance represented by the vector 110.

A shifting of the base line of the magnetic amplifier 26 to a position as represented by the base line 114 shifts both the vectors 102 and 104 to the right a distance as represented by the distance between the base lines 112 and 114. Thus, since the vector 104 had already been decreased by the normal regulating action an amount represented by the vector 108, this shifting of the vector 104, as effected by the compounding circuit 30, would then complete the desired correcting action. Therefore, the normal regulating action of the regulator loop illustrated in Fig. 1 effects a portion of the correction and the compounding circuit 30 effects the remainder of the correction, to thereby maintain the magnitude of the output voltage of the generator 12 at a substantially constant value.

As hereinbefore mentioned, the compounding circuit 30 also compensates for changes in the speed of the generator 12 and the exciter 16. For instance, a decrease in the speed of the generator 12 and the exciter 16 decreases the output voltage of the generator 12, to thereby increase the power output of the magnetic amplifier 26. An increase in the power output of the magnetic amplifier 26 increases the magnitude of the output voltage of the armature 20 of the exciter 16. Such an action effects a partial correction for the decrease in the speed, however, the compounding circuit 30 as hereinbefore explained with reference to temperature compensation, effects a further increase in the power output of the magnetic amplifier 26, to thereby effect the remaining necessary correcting action.

An increase in the speed of the generator 12 and its associated exciter 16 increases the output voltage of the generator 12, and under such conditions the regulator system 10, including the compounding circuit 30, effects a return of the output voltage of the generator 12 to its regulated value in a manner as hereinbefore described with reference to temperature compensation.

The compounding circuit 30 also cooperates to provide a proper additional correcting action for changes in the load on the generator 12. For instance, an increase in load on the generator 12 decreases its output voltage and thus the compounding circuit 30 cooperates in the manner hereinbefore described to aid in returning the output voltage of the generator 12 to its regulated value. The compounding circuit 30 also aids in returning the output voltage of the generator 12 to its regulated value when a decrease in the load on the generator 12 occurs.

Figure 3:
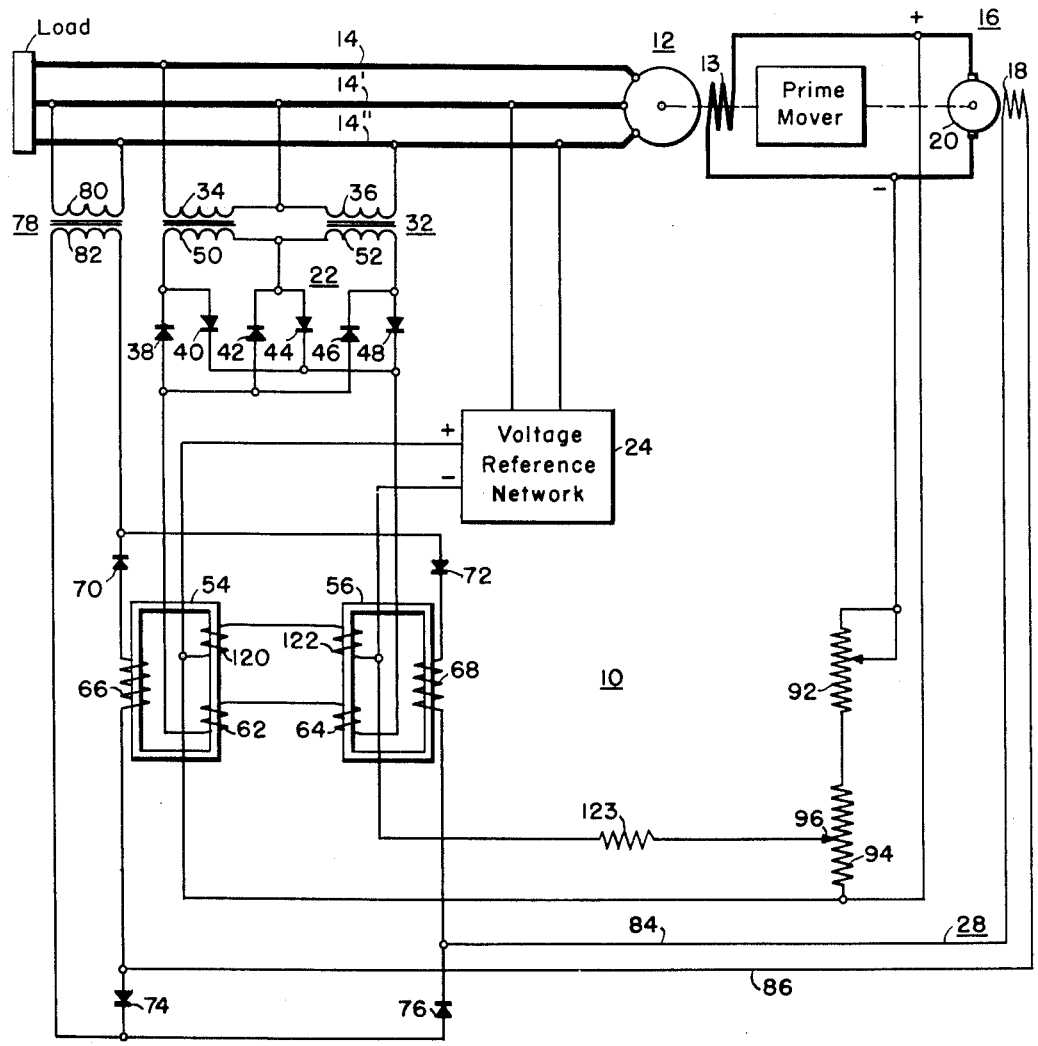
Fig. 3 is a schematic diagram of another embodiment of this invention in which the number of control windings disposed in the magnetic amplifier regulator are minimized.

Referring to Fig. 3 there is illustrated another embodiment of this invention in which like components of Figs. 1 and 3 have been given the same reference characters. The main distinction between the apparatus of Figs. 1 and 3 is that in the apparatus of Fig. 3 control windings 120 and 122 perform the function of the reference windings 58 and 60 and the control or compensating windings 88 and 90, as illustrated in Fig. 1.

The control windings 120 and 122 are responsive to the output voltage of the armature 20 of the exciter 16. In particular, the control windings 120 and 122 are connected in series circuit relationship with one another and with a resistor 123 having a high resistance value, one end of the series circuit being connected to the lower end of the variable resistor 94, as illustrated, and the other end of the series circuit being connected to the movable contact member 96 of the variable resistor 94. The function of the resistor 123 is to limit the flow of harmonic currents induced in the control windings 120 and 122 by the load windings 66 and 68. Thus, the response time and hence the stability of the magnetic amplifier is not impaired. The resistor 123 also prevents interaction of the two voltages from the armature 20 of the exciter 16 and from the voltage reference network 24.

The control windings 120 and 122 are also responsive to the output voltage of the voltage reference network 24. Since the remainder of the apparatus as illustrated in Fig. 3 is similar to the apparatus as illustrated in Fig. 1, and since the operation of the remainder of the apparatus illustrated in Fig. 3 is similar to the operation of the corresponding apparatus illustrated in Fig. 1, a further description of such operation is deemed unnecessary.

It is to be understood that although this invention has been illustrated by reference to a particular type of magnetic amplifier 26, it is equally applicable to other known types of magnetic amplifiers to which this invention could be applied by one skilled in the art. Further, the comparison between the variable and the reference signal could be made outside of the magnetic amplifier. In such a case it would be only necessary to provide two control coils instead of the four control coils 58, 60, 62 and 64 shown in Fig. 1. It is also to be understood that this invention could be applied to a carbon pile regulator (not shown) instead of to a magnetic amplifier regulator as shown, by utilizing suitable control windings.

The apparatus embodying the teachings of this invention has several advantages. For instance, proper compensation for changes in the temperature of the field winding 13 of the generator 12, for changes in the speed of the generator 12 and its associated exciter 16, and for changes in the load on the generator 12 is obtained, to thereby maintain the magnitude of the output voltage of the generator 12 substantially constant, without impairing the stability of the regulator system 10. In addition, this compensation is obtained by utilizing a magnetic amplifier 26 having a minimum size. Further, the incremental correction effected by the compounding circuit 30 is the largest when the greatest correction is required (e. g., low speed, heavy load), and is smallest when the least correction is required (e. g., high speed, no load). Also, the regulator system 10 contains no energy-storage elements such as capacitors and inductors, therefore, system stabilization and voltage recovery time are essentially unchanged. Further, the regulator system 10 is simple and is readily adjustable to match differences in characteristics of machines such as the generator 12 and the exciter 16.

Since certain changes may be made in the above apparatus and circuits and different embodiments of the invention may be made without departing from the scope thereof, it is intended that all matter contained in the above description and shown in the accompanying drawings shall be interpreted as illustrative and not in a limiting sense.

I claim as my invention:

1. In a regulator system for controlling a generator-exciter combination comprising a generator field winding and an exciter armature and in which the generator field winding is energized in accordance with the output voltage of the exciter armature, the combination comprising, a magnetic amplifier, means interconnected between the magnetic amplifier and the output of the generator for effecting a change in the magnitude of the output of the magnetic amplifier in accordance with the deviation of the output voltage of the generator from its regulated value, means for rendering the exciter responsive to the output of the magnetic amplifier, whereby a decrease in the output voltage of the generator effects an increase in the output of the magnetic amplifier and thus an increase in the output voltage of the exciter armature, and means responsive to gradual changes in the output voltage of the exciter armature for effecting a further increase in the output of the magnetic amplifier with an increase in the output voltage of the exciter armature, to thereby provide accurate regulation without impairing the stability of the regulator system.

2. In a regulator system for controlling a generator-exciter combination comprising a generator field winding and an exciter armature and in which the generator field winding is energized in accordance with the output voltage of the exciter armature, the combination comprising, a magnetic amplifier, the magnetic amplifier including magnetic core means, and a load winding and a control winding disposed in inductive relationship with the magnetic core means, the load winding being connected to be energized so as to effect a flow of current through the field winding of the exciter, means interconnected between the magnetic amplifier and the output of the generator for effecting a change in the magnitude of the output of the magnetic amplifier in accordance with the deviation of the output voltage of the generator from its regulated value, whereby a decrease in the output voltage of the generator effects an increase in the output of the magnetic amplifier and thus an increase in the output voltage of the exciter armature, and circuit means for rendering said control winding responsive to gradual changes in the output voltage of the exciter armature, the load winding and the said control winding being so disposed on the magnetic core means that current flow therethrough effects a flux in the same direction in the magnetic core means, whereby the output of the magnetic amplifier is further increased with an increase in the output voltage of the exciter armature, to thereby provide accurate regulation without impairing the stability of the regulator system.

References Cited in the file of this patent

UNITED STATES PATENTS 2,498,268   Harder et al. _____ Feb. 21, 1950